United States Patent

[11] 3,620,785

| [72] | Inventors | Roland L. Root<br>Tulsa;<br>Louis H. Eilers, Inola, both of Okla. |
|---|---|---|
| [21] | Appl. No. | 42,758 |
| [22] | Filed | June 2, 1970 |
| [45] | Patented | Nov. 16, 1971 |
| [73] | Assignee | The Dow Chemical Company<br>Midland, Mich. |

[54] ALUM CONTAINING ALUMINOUS CEMENTS
5 Claims, 1 Drawing Fig.

[52] U.S. Cl. ............................................ 106/104,
106/314, 106/315
[51] Int. Cl. ........................................... C04b 7/32
[50] Field of Search............................................ 106/104,
314, 315; 166/292, 293

[56] References Cited
UNITED STATES PATENTS

| 3,215,549 | 11/1965 | Ericson .......................... | 106/104 |
| 3,180,748 | 4/1965 | Holmgren..................... | 106/104 |
| 2,376,919 | 5/1945 | Hutchcroft.................... | 106/104 |

*Primary Examiner*—Tobias E. Levow
*Assistant Examiner*—W. T. Scott
*Attorneys*—Griswold and Burdick and Charles W. Carlin ABSTRACT: An hydraulic cement composition comprising an aluminous cement and an alum and method of cementing comprising admixing said composition with water and emplacing it in a geologic formation via a well penetrating the formation.

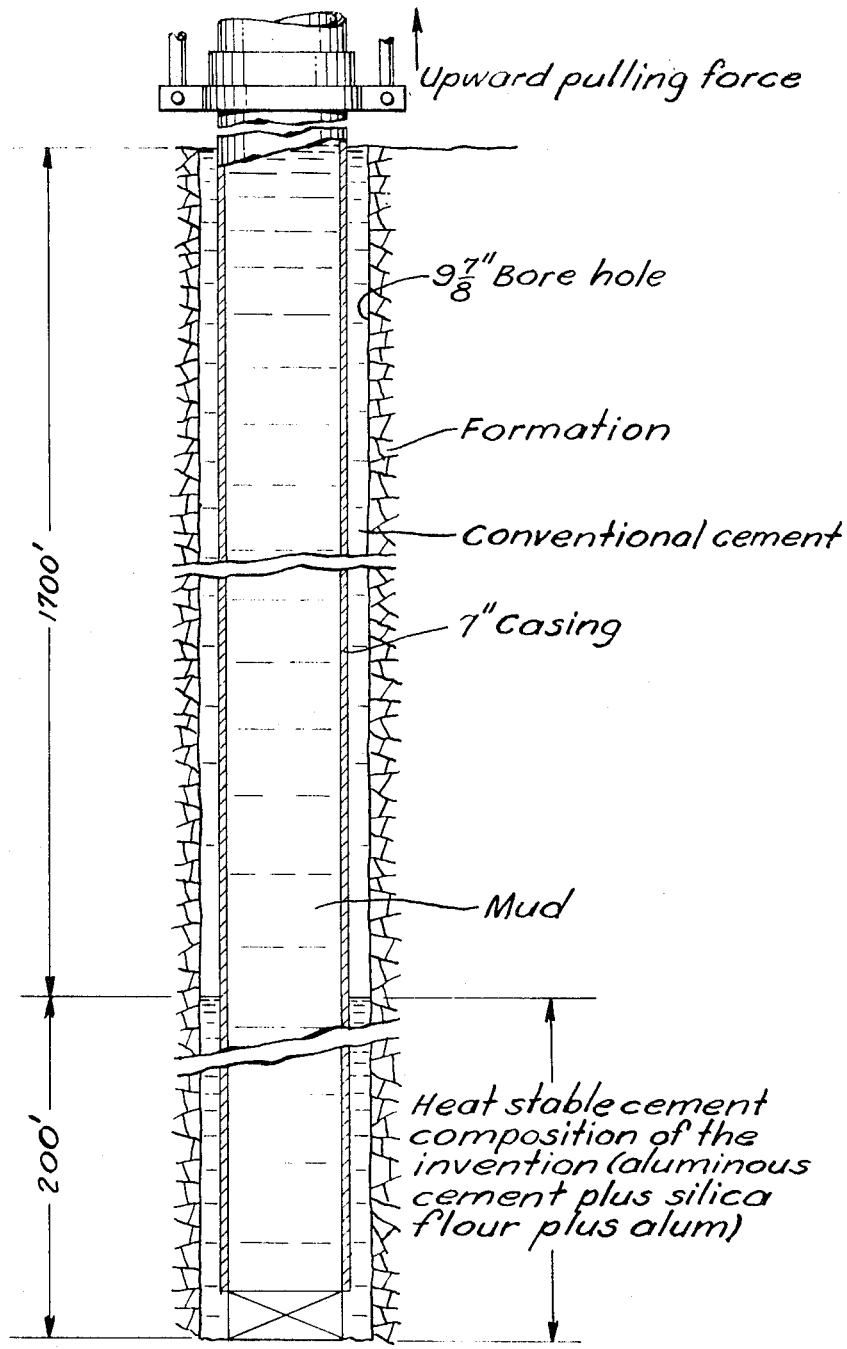

ALUM CONTAINING ALUMINOUS CEMENTS

BACKGROUND OF INVENTION

The use of thermal stimulation methods has facilitated the production of low gravity, high-viscosity crude oils. One of the more widely used methods of thermal stimulation is the intermittent injection of steam. Another common method of thermal stimulation is fireflooding. However, steam injection has presented many problems, e.g., when employed in well completions. One of these problems is failure of the casing and cement due to the stresses which result from high temperature and high pressure steaming.

To solve this problem, one practice is (after running casing down the well) to prestress the casing. One technique to accomplish this objective is to use two different cementing compositions to hold the casing in place. Broadly, the process may be performed as follows: First, a relatively temperature-stable cement system having a fluidity life of 8 to 12 hours is injected down the casing, around the lower end thereof, and forced upward in the annulus in an amount sufficient to fill a substantial portion of the annulus. A second aqueous cement system, which has a short fluidity life and rapid development of compressive strength, is injected (while the first injected slurry is still fluid) down the casing in sufficient amount to fill the bottom 150 to 300 feet of annulus and the lower portion of the casing thereby forcing the first injected slurry upward. Sufficient time is allowed thereafter for the bottom cement composition to develop enough compressive strength to anchor the casing firmly in place. Not less than about 1,500 p.s.i. compressive strength cement is usually considered adequate for the second cement slurry to accomplish this purpose. The casing is then subjected to an elongational strain by applying an upward stress, usually by means of a mechanical means applied near ground level. The tension is maintained until the upper cement composition has developed sufficient strength and bond to hold the casing in the strained condition after the mechanical stress or tensioning means has been released.

The bottom cement composition usually is the cement which is emplaced in the oil-bearing zone. It is essential that this cement remain stable at the highest steaming temperatures and pressures to be encountered. Aluminous or high calcium aluminate cement, of which Lumnite is illustrative, is a known temperature-stable cement, and is often used for this purpose in preference to Portland cement. Below is a description of aluminous cement taken substantially from *Kirk-Othmer Encyclopedia of Chemical Technology*, 2nd Edition, Vol. 4 (1964), page 696, published by Interscience, New York.

High-alumina cement, known also as aluminous cement and sometimes as cement Fondu, is not Portland cement. It is made by fusing a mixture of limestone and bauxite with small amounts of silica and titania. In Europe, the process is usually carried out in an open-hearth furnace having a long vertical stack into which the mixture of raw materials is charged. The hot gases produced by a blast of pulverized coal and air pass through the charge and carry off the water and carbon dioxide. Fusion occurs when the charge drops from the vertical stack onto the hearth at a temperature of about 1,425 to 1,500° C. The molten liquid runs out continuously into steel pans on an endless belt in which the melt solidifies. Electric-arc furnaces also have been used when electric power is cheap. In the United States, the mixture is burned in a rotary kiln similar to that used for Portland cement but provided with a tap hole from which the molten liquid is drawn intermittently. The black solidified sinter is dumped onto a storage pile from which it is transferred to crushing and grinding mills where it is reduced without additions to a fine powder.

The cement is composed of about 36 to 42 percent $Al_2O_3$, about the same amount of CaO, 7 to 18 percent oxides of iron, 5 to 10 percent $SiO_2$, and small amounts of $TiO_2$, MgO, and alkalies. A number of compounds are formed, most important of which are $CaO \cdot Al_2O_3$; $6CaO \cdot 4Al_2O_3$, $FeO \cdot SiO_2$, $2CaO \cdot Al_2O_3 \cdot SiO$, and ferrites. The setting and hardening are probably brought about by the formation of calcium aluminate gels, such as $CaO \cdot Al_2O_3 \cdot 10H_2O$, $2CaO \cdot Al_2O_3 \cdot 8H_2O$, and $3CaO \cdot Al_2O_3 \cdot 6H_2O$.

One of the notable properties of high-alumina cement is its development of very high strengths at early ages. It attains nearly its maximum strength in less than a day, which is much higher than the strength developed by Portland cement at that age. At higher temperatures, however, the strength drops off rapidly. Heat is also evolved rapidly on hydration and results in high setting temperatures. The resistance of the cement to corrosion in sea or sulfate waters, as well as its resistance to weak solutions of mineral acids, is outstanding. A typical analysis of an aluminous cement is:

| Constituents | Percent by weight |
| --- | --- |
| $SiO_2$ | 8 to 9 |
| $Al_2O_3$ | 40 to 41 |
| CaO | 36 to 37 |
| $Fe_2O_3$ | 5 to 6 |
| FeO | 5 to 7 |
| $TiO_2$ | about 2.0 |
| MgO | about 1.0 |
| S | about 0.2 |
| $SO_3$ | about 0.2 |
| Metallic Iron | Trace |

One problem associated with the use of the aluminous cement is that it does not have adequate rapid development of compressive strength at temperatures from 80° to 120° F. for such uses as that of quick bonding of the lower end of a casing in a well. Materials commonly used to accelerate the compressive strength of Portland cements, such as calcium chloride, have been found to be ineffective for this purpose in aluminous cement. Materials or techniques which have been used to accelerate the compressive strength of aluminous cement slurries are aluminum chloride, Portland cement, or reduction of the water to solids ratio of the aluminous cement slurries. However, with the use of these processes it has been found that they are either not totally effective or that they shorten the fluidity life of the slurry. This is undesirable since the slurry must retain adequate fluidity for a time sufficient to allow for its proper placement in the wellbore.

SUMMARY OF INVENTION

Our invention is a composition and method of use by which the development of the compressive strength of aluminous cement slurries is accelerated without adversely affecting the fluidity life or compressive strength of that same slurry.

The use of the aluminous cement-alum aqueous slurry in well cementing to effectuate an early firm bond between the lower end of a casing and the formation to facilitate placing the casing under longitudinal strain during the setting of a conventional cement slurry thereabove constitutes the salient aspects of the method of the invention.

The invention may be practiced by admixing an alum, e.g., $AlK(SO_4)_2 \cdot 12H_2O$, with aluminous cement and water or brine whereby attainment of adequate compressive strength of the aluminous cement slurry is accelerated at temperatures preferably ranging from about 80° to about 150° F. but lower and higher temperature limits are operable.

The amount of alum used to accelerate the attainment of compressive strength of the aluminous cement ranges from about 0.1 percent to about 3.0 percent by dry weight of the cement present. At concentrations higher than about 3 percent, the alum may still accelerate the compressive strength of aluminous cement but tends to cause too rapid gelation of the slurry. This gelation results in the slurry becoming too viscous to be easily pumpable.

Being of similar chemical nature, all common alums exhibit similar properties in admixture with aluminous cement. However, potassium alum is most commonly used in the practice of the invention. Ammonium alum, i.e., $AlNH_4(SO_4)_2 \cdot 12H_2O$, is also a practical and convenient alum to employ.

The concentration of alum required to accelerate sufficiently the development of compressive strength of aluminous cement is dependent upon the temperature at which the cement is to be cured. The recommended concentration is in the range of between about 0.1 to 3.0 percent, as aforesaid.

The addition of an alum to Lumnite (aluminous cement) in the recommended concentration ranges will not significantly affect the fluidity life of the slurry. Compounds such as calcium lignosulfonate can be used in conjunction with an alum to extend the fluidity life of the slurry without noticeably interfering with the acceleration of the development of the compressive strength. An alum can be used without any adverse effects on aluminous cement containing temperature-stabilizing materials such as silica flour. The addition of an alum to Lumnite will increase the resistance to high temperature of said cement when set at very high temperatures. Actual tests have shown the set cement of the invention to remain unimpaired at 1,600° F.

ILLUSTRATIVE PRACTICE OF INVENTION

To those familiar with the art of oil well cementing, fluidity life of slurries is commonly referred to as thickening time. The longer the thickening time, the greater the fluidity of the slurry. The accepted method of determining the thickening time of cement slurries is described in the American Petroleum Institute Bulletin RP 10B "Recommended Practice for Testing Oil Well Cements and Cement Additives," Fifteenth Edition, Jan. 1967. The thickening time of the aluminous cement slurries was determined in accordance with API Test Schedule No. 2. This test schedule typifies the well conditions of many oil wells which are being steam stimulated, e.g., in the California area. Lumnite cement, a commercially available aluminous cement, is used in the examples.

To determine the compressive strength of the Lumnite cement slurries, specimens were prepared and poured into 2 inch × 2 inch × 2 inch molds. The samples were then cured in these molds under water for the designated time and temperature. At the end of the test time, the set samples were removed from the molds and the compressive force required to break the cubes was determined by means of a Tinius Olsen Hydraulic Press. This breaking force was then converted to p.s.i. by division thereof by the appropriate factor which is supplied with the operating instructions for the Press.

All slurries, except those which contain 20 percent silica flour, were mixed with 44 percent water by dry weight of the Lumnite cement. The slurries which contain 20 percent silica flour were mixed with 52 percent water, by dry weight of the Lumnite cement. Table I shows that potassium alum accelerates the compressive strength of Lumnite cement.

TABLE I

| Cement | Compressive Strength in p.s.i. after 4 Hr. aging at 110° at Atmospheric Pressure |
|---|---|
| Lumnite (no alum) | Not set |
| Lumnite + 0.1% K alum | 1,104 |
| Lumnite + 0.5% K alum | 3,310 |
| Lumnite + 1.0% K alum | 2,427 |
| Lumnite + 2.0% K alum | 1,772 |
| Lumnite + 5.0% K alum* | 1,253 |

*Note: When 5.0% alum is used, immediate gelation occurs, which results in a slurry which is too viscous to be considered pumpable.

In other tests, ammonium alum was employed in the practice of the invention. Table No. II shows that other common alums, such as ammonium alum, accelerate the compressive strength of Lumnite cement.

TABLE II

| Cement | Compressive Strength in p.s.i. after 4 Hr. aging at Atmospheric Pressure | |
|---|---|---|
| | 100° F. | 110° F. |
| Lumnite | Not set | Not set |
| Lumnite | 1,690 | 2,100 |

The tests shown in table No. III were run to show the effect of varying the amount of alum needed to accelerate the development of compressive strength at different curing temperatures.

TABLE III

| Cement | Temp. (° F.) | Compressive strength in q.s.i. after aging for— | | | |
|---|---|---|---|---|---|
| | | 4 hrs. | 6 hrs. | 8 hrs. | 12 hrs. |
| Lumnite (no alum) | 80 | (1) | (2) | (2) | (2) |
| Lumnite+0.5% K alum | 80 | (1) | (2) | 33 | 1,996 |
| Lumnite+1.0% K alum | 80 | (1) | 59 | 925 | 1,975 |
| Lumnite+2.0% K alum | 80 | (1) | 1,388 | 1,896 | 2,571 |
| Lumnite (no alum) | 110 | (2) | 2,010 | 2,767 | 2,515 |
| Lumnite+0.5% K alum | 110 | 3,310 | 2,813 | 2,506 | 2,462 |
| Lumnite+1.0% K alum | 110 | 2,427 | 2,838 | 2,715 | 2,967 |
| Lumnite+2.0% | 110 | 1,772 | 2,283 | 1,422 | 2,313 |
| Lumnite+0.5% K alum +20% silica flour | 110 | 1,525 | (1) | (1) | (1) |

1 Not run.  2 Not set.

Table III shows that, when an alum is present, any temperature between 80° and 110° F. produces a set cement, but that the set is faster at the higher temperatures. Performance at higher temperatures than 110° F. may be ascertained by extrapolation, if desired.

TABLE IV

| Cement | Thickening Time API Schedule 2 (Hr:Min) | Compressive Strength, p.s.i. at Atmospheric Pressure Cured 4 Hr. | |
|---|---|---|---|
| | | 100° | 110° |
| Lumnite | 0:56 | Not set* | Not set* |
| Lumnite +1% K alum | 1:28 | 1,515 | 2,427 |
| Lumnite +1% K alum +0.1% CAL. ** | 2:26 | 1,602 | 2,254 |
| Lumnite +1% alum +0.2% CAL. | 3:11 | 1,083 | 1,980 |
| Lumnite +1% NH₄ alum | 1:08 | 1,690 | 2,100 |
| Lumnite +1% NH₄ alum +0.1% CAL. | 2:51 | 1,503 | 2,477 |

*Not set means that the cement would not bear a load of 100 p.s.i., even though the cement viscosity exceeded 100 poise after 56 minutes.

** CAL is calcium lignosulfonate, Marabond brand from Marathon.

Table IV shows that the presence of an alum in a Lumnite slurry does not adversely affect the fluidity life of the slurry and also shows that calcium lignosulfonate compounds can be used to extend the fluidity life of the slurry without adversely affecting the accelerated development of compressive strength.

Alum can be used with temperature-stabilizing materials, such as silica flour, if desired without any adverse effects.

TABLE V

| p.s.i. after aging Cement | Compressive Strength in at 1,600° F. |
| --- | --- |
| Neat Lumnite (no alum) | 1,104 |
| Lumnite + 1% K alum | 1,538 |
| Lumnite + 3% K alum | 1,618 |

The tests of table V were run to show the effect of high temperatures on an alum Lumnite cement.

Table V shows that an alum in an aluminous cement slurry, in accordance with the invention, increases the resistance to degradation by high temperature of the set Lumnite cement at temperature up to 1,600° F. Specimens were cured for 3 days under water at 80° F., then fired in a furnace for 5 days at 1,600° F., then cooled in air for 2 days, and then broken to determine compressive strength.

The relative vertical positions of the cement of the invention and of the conventional cement in the wellbore is important. The order of injection is not. Therefore, a slurry of the cement of the invention may be pumped down the well casing and a portion thereof pushed around the lower casing end into the annulus and the conventional cement thereafter pumped down the annulus, coming to rest on the cement slurry of the invention; or the conventional cement may be pumped down the casing and pumped around the lower end thereof and upward in the annulus, followed by injection of the cement of the invention being also pumped down the casing behind the conventional cement slurry (pushing the conventional cement upwardly in the annulus) and being emplaced at the foot of the casing. The latter is the more common practice, the former being applicable chiefly to relatively shallow wells.

The cement composition of the invention may be employed in a manner similar to that observed in well-cementing generally, i.e., the prepared aqueous slurry is pumped down the wellbore and emplaced in the zone where casing is to be secured in place or the flow of fluid is to be inhibited.

However, the cement of the invention offers a special utility in a multicementing job wherein a well casing is to be held in conventional-type cement near or at its lower end by a fast-setting strong cement of the aluminous cement type. The need is particularly acute wherein steam is to be subsequently injected down a well casing and accordingly it is desirable that the casing be prestressed by undergoing longitudinal strain while a cement is setting about the upper portion of it.

The method of the invention comprises emplacing the aluminous cement-alum brine or water slurry at the lower end of the casing and a conventional-type cement is emplaced above this to fill a substantial portion of the annulus. When the cement of the invention has substantially set or has acquired a compressive strength of at least about 1,200 p.s.i., the casing is strained longitudinally by an upward stress until the conventional cement has substantially set or has acquired a compressive strength of at least about 1,000 p.s.i.

It is to be understood that the above examples are illustrative of the invention and are not limitations of the practice thereof; such limitations are in accordance with the appended claims. For example, alums other than those of potassium and ammonium may be used. Any aluminous cement may be used substantially as successfully as Lumnite cement. Any of a number of fluid-loss additives, density-modifying or turbulence-inducing agents, or other compositions known to accelerate the set of aluminous cement slurries may be employed in addition to the alum employed in the example. The cement slurry of the invention may be used at temperatures between about 40° F. and 500° F., but the invention offers a special advantage at temperatures between about 80° and 150° F.

The following example is illustrative of the practice of the invention.

A wellbore penetrating a formation containing low API gravity crude oil requires the casing to be emplaced and subjected to strain by stress applied thereto in anticipation of subsequent in situ steam treatment. The casing string is lowered into place according to known practice, extending downward to a distance somewhat above the bottom of the borehole.

A conventional aqueous Portland slurry, e.g., API Class A cement in water, is injected down the casing, followed by the aluminous-alum slurry of the invention and forced, in that order, around the lower end of the casing and upward in the annulus to a distance such that the lower level of the conventional cement slurry in the annulus is about 200 feet from bottom and the aluminous-alum slurry of the invention occupies the annular space below the conventional cement and also fills the casing for a relatively short distance from bottom. The cement slurries are followed by drilling mud as a displacing medium.

After a few hours, the cement slurry of the invention will have set and acquired substantial strength, but the conventional Portland cement slurry will not have. There is then applied an upward pulling force on the casing to put the casing under longitudinal strain, and such strain maintained until the conventional cement slurry has set. Excess cement may thereafter be drilled out of the casing. The casing will have thereby been prestressed. Heat may be thereafter injected down the casing with less likelihood of damage from expansion of the casing due to heat that is encountered in the thermal operations.

Reference to the drawing shows the relative positions of the conventional cement slurry and the aluminous-alum slurry of the invention. As shown, the conventional slurry is above a 200 foot level from bottom. Below this is the slurry of the invention. A pulling force is indicated, on the casing at the top of the well, which is applied between the setting time of the conventional cement slurry and the longer time required for the cement employed according to invention to set.

Having described our invention, what we claim and desire to protect by Letters Patent is:

1. The fast-setting hydraulic cement composition consisting essentially of by weight 100 parts of an aluminous cement, between about 35 and 65 parts of water, and between about 0.1 and about 3.0 parts of an alum.

2. The composition of claim 1 wherein the alum is selected from the class consisting of $AlNH_4(SO_4)_2 \cdot 12H_2O$ and $AlK(SO_4)_2 b \cdot 12H_2O$.

3. The composition of claim 1 wherein the alum is present in an amount of between about 0.5 and 2.0 parts per 100 parts of the aluminous cement.

4. The composition of claim 1 wherein silica flour is admixed therewith in an amount up to about 25 parts per 100 parts of the cement.

5. The composition of claim 1 wherein calcium lignosulfonate is admixed therewith in an amount up to about 1 part per 100 parts of the cement.

* * * * *

PO-1050
(5/69)

UNITED STATES PATENT OFFICE
CERTIFICATE OF CORRECTION

Patent No. 3,620,785      Dated 16 Nov. 1971

Inventor(s) Roland L. Root and Louis H. Eilers

It is certified that error appears in the above-identified patent and that said Letters Patent are hereby corrected as shown below:

In column 1, line 75, change "SiO," to --$SiO_2$--.

In column 2, line 3, change "6HO" to --$6H_2O$--.

In column 3, Table 1, the 4th line in the first column, delete "2,427" and insert --2,427-- in the 4th line under the second column.

In column 4, line 11, insert -- +1.0% $NH_4$ Alum -- under the second "Lumnite" in the first column; in Table 3, the heading in the last columns, change "q.s.i." to --p.s.i.--; in Table IV, the first line, change "0.56" from the first column to the second column; in Table IV, line 12, change "2:51" from the first column to the second column.

In column 5, Table V, change "p.s.i. after aging" from the heading in the first column to the heading in the second column.

In column 5, line 53, delete "conventional type cement" and insert -- place --.

In column 6, line 50, insert --the-- between "to" and "invention"; in line 59, change "$AlK(SO_4)_2b.12H_2O$." to --$AlK(SO_4)_2 \cdot 12H_2O$.--.

In column 4, Table III, the 8th line, delete "Lumnite ± 2.0%" and insert --Lumnite + 2.0%--.

Signed and sealed this 27th day of June 1972.

(SEAL)
Attest:

EDWARD M. FLETCHER, JR.
Attesting Officer

ROBERT GOTTSCHALK
Commissioner of Patents